United States Patent [19]

Julicher

[11] Patent Number: 5,630,442
[45] Date of Patent: May 20, 1997

[54] TAMPER RESISTANT CONSTRUCTION FOR HYDRANT ACTUATING NUT

[75] Inventor: Bradley J. Julicher, Williamsville, N.Y.

[73] Assignee: McGard, Inc., Orchard Park, N.Y.

[21] Appl. No.: 651,294

[22] Filed: Jun. 7, 1996

[51] Int. Cl.$^6$ ............................. F16K 35/06; E03B 9/06
[52] U.S. Cl. .................. 137/296; 81/124.3; 137/382.5; 137/800; 220/284; 220/725; 220/726; 220/727; 251/214; 251/291
[58] Field of Search .......................... 137/296, 371, 137/377, 381, 382, 382.5, 800; 220/284, 724, 725, 726, 727; 251/214, 291, 292; 81/124.3, 125, 125.1

[56] References Cited

U.S. PATENT DOCUMENTS

| Re. 27,616 | 4/1973 | Diaz | 137/382.5 |
|---|---|---|---|
| 2,576,631 | 11/1951 | Mueller et al. | 137/13 |
| 2,762,386 | 9/1956 | Fogle | 137/296 |
| 3,070,115 | 12/1962 | Jester | 137/296 |
| 3,450,148 | 6/1969 | Mongelluzzo et al. | 137/296 |
| 3,453,897 | 7/1969 | Adinolfi | 74/89.15 |
| 3,626,961 | 12/1971 | Quinones | 137/296 |
| 3,709,249 | 1/1973 | Diaz | 137/296 |
| 3,840,041 | 10/1974 | McMurray | 137/296 |
| 3,916,939 | 11/1975 | Gillard | 137/296 |
| 3,935,877 | 2/1976 | Franceschi | 137/296 |
| 4,033,372 | 7/1977 | Bowman | 137/296 |
| 4,369,807 | 1/1983 | Camp | 137/296 |
| 4,526,193 | 7/1985 | Drach | 137/296 |
| 4,566,481 | 1/1986 | Leopold, Jr. et al. | 137/296 |
| 4,620,428 | 11/1986 | Kopesky | 70/175 |
| 4,633,896 | 1/1987 | Bainbridge et al. | 137/296 |
| 4,716,922 | 1/1988 | Camp | 137/296 |
| 4,936,336 | 6/1990 | McCauley et al. | 137/296 |
| 5,205,312 | 4/1993 | Jerman et al. | 137/296 |

FOREIGN PATENT DOCUMENTS

| 734267 | 4/1943 | Germany | 137/296 |
|---|---|---|---|

*Primary Examiner*—George L. Walton
*Attorney, Agent, or Firm*—Joseph P. Gastel

[57] ABSTRACT

A tamper resistant construction for preventing unauthorized actuation of the hydrant nut of a fire hydrant by causing any lateral pounding or upward forces applied to the tamper resistant construction to be transmitted directly to the hydrant body cover of the fire hydrant including a packing nut threaded into the hydrant body cover proximate the hydrant nut, a hydrant nut actuating body located within the packing nut and mounted on the hydrant nut in turning relationship therewith, a groove in the packing nut, a plurality of studs extending between the hydrant nut actuating body and the groove in the packing nut, a shroud rotatably mounted on the hydrant nut actuating body in closely spaced relationship to a cap rotatably mounted on the hydrant nut actuating body, and a limited space between the cap and the shroud for receiving a special wrench.

26 Claims, 2 Drawing Sheets

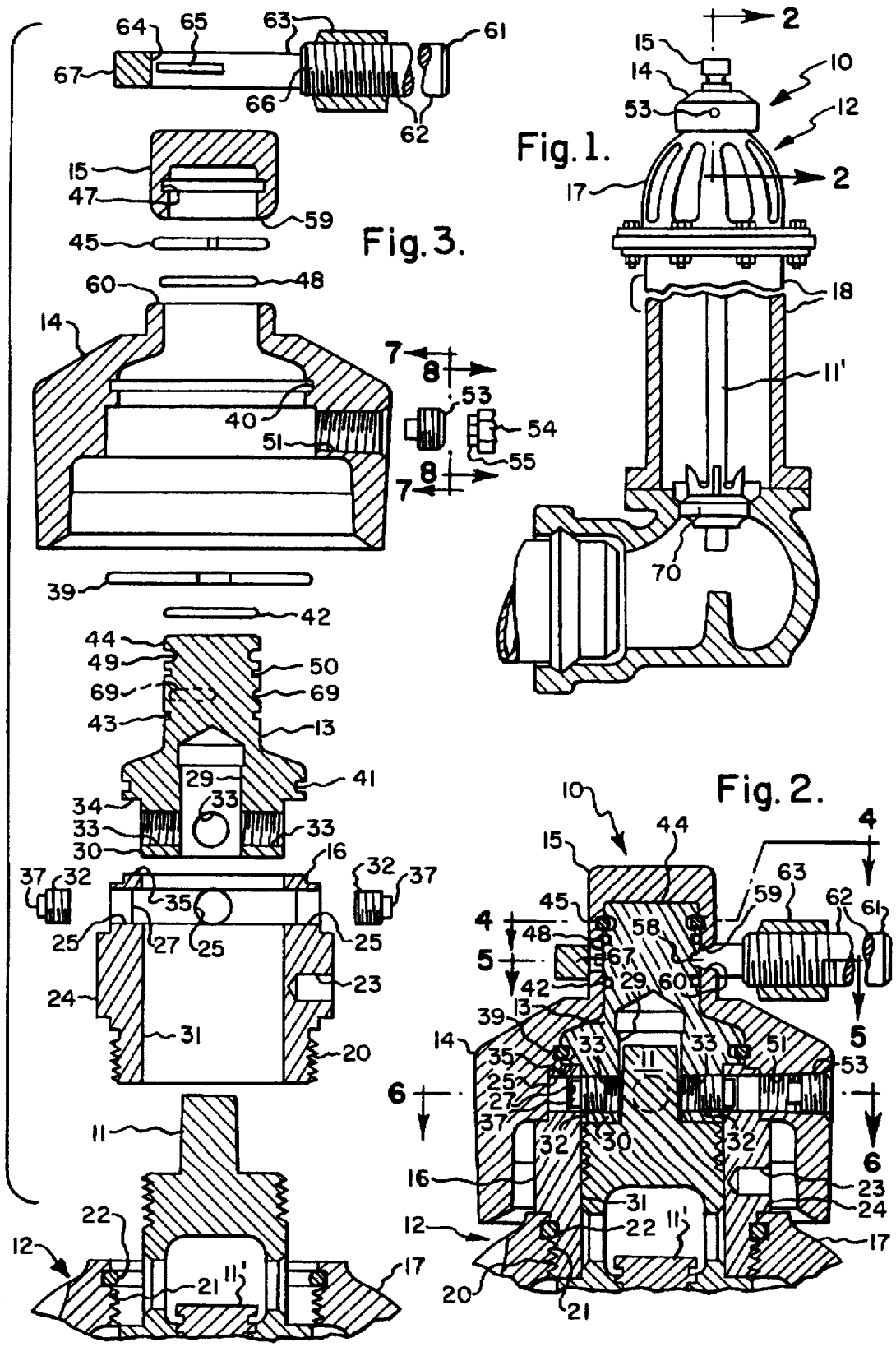

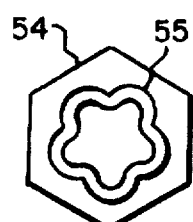
Fig. 8.
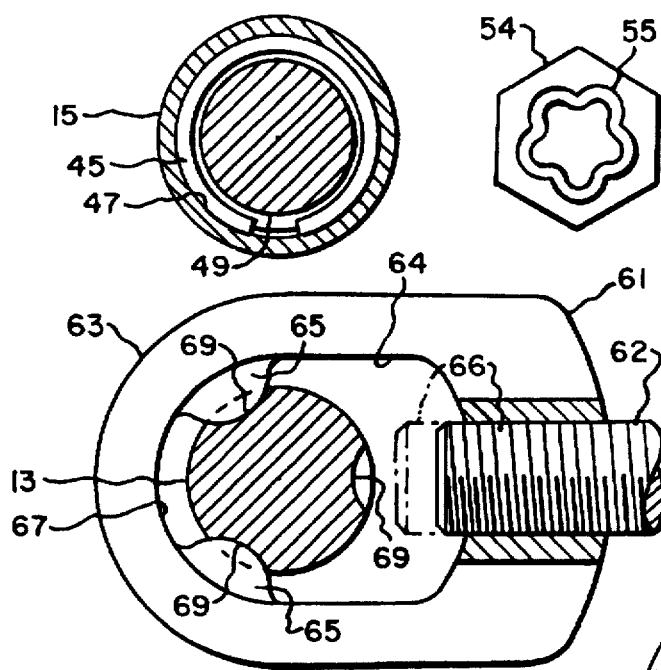
Fig. 4.
Fig. 5.
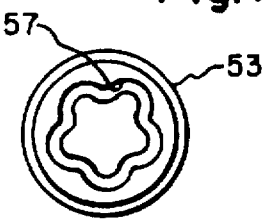
Fig. 7.
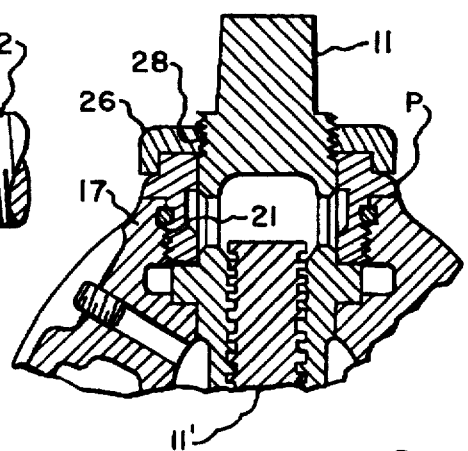
Fig. 9
PRIOR ART
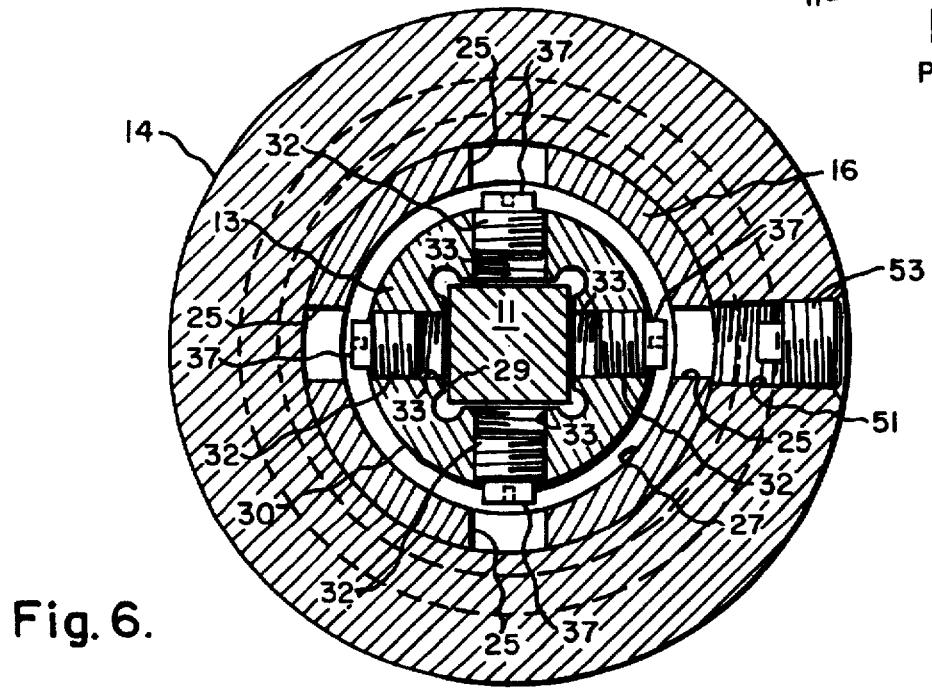
Fig. 6.

TAMPER RESISTANT CONSTRUCTION FOR HYDRANT ACTUATING NUT

BACKGROUND OF THE INVENTION

The present invention relates to an improved tamper resistant construction for preventing unauthorized turning of the actuating nut of a fire hydrant and it is an improvement over the construction disclosed in U.S. Pat. No. 4,936,336.

By way of background, as is well known, unmodified fire hydrants can be opened by anyone having a wrench which can turn the hydrant nut, which can result in the unauthorized use of water. In prior tamper resistant constructions, such as shown in the above-mentioned U.S. Pat. No. 4,936, 336, any pounding or wedging action applied to the tamper resistant construction, in an attempt to disable it, is transmitted directly to the hydrant nut which is usually fabricated from brass and can be less than one square inch in cross section and is thus susceptible to breakage. If it should break, the entire tamper resistant construction can be removed from the hydrant and access can be had to the remaining portion of the hydrant nut to thereby unauthorizedly turn it or the hydrant can be rendered inoperable.

SUMMARY OF THE INVENTION

It is accordingly the object of the present invention to provide an improved tamper resistant construction for the nut of a fire hydrant which can be installed easily and simply on an existing fire hydrant and which will transmit any forces applied thereto directly to the massive cast iron hydrant body and not directly to the more delicate hydrant actuating nut. Other objects and attendant advantages of the present invention will readily be perceived hereafter.

The present invention relates to a tamper resistant construction for preventing unauthorized actuation of a fire hydrant comprising a packing nut, a hydrant nut actuating body having a portion located within said packing nut, a hydrant nut receiving recess in said hydrant nut actuating body, a groove in the packing nut, a plurality of studs extending between the hydrant nut actuating body and said groove in said packing nut, at least one bore in said packing nut in communication with said groove and alignable with said studs, a shroud rotatably mounted on said hydrant nut actuating body, and a cap rotatably mounted on said hydrant nut actuating body proximate said shroud.

The present invention also relates to a tamper resistant construction for the nut of a fire hydrant having a hydrant body and a hydrant cover mounted on said hydrant body and a hydrant shaft having an upper portion with a valve-actuating polygonal nut positioned at said upper portion of said hydrant shaft and extending outwardly from said hydrant cover, said construction for rendering said nut tamper resistant against unauthorized actuation comprising a packing nut threaded into said hydrant cover proximate said upper portion of said hydrant shaft, a hydrant nut actuating body, a recess in said hydrant nut actuating body for receiving said polygonal nut in turning relationship, a plurality of circumferentially spaced threaded openings in said hydrant nut actuating body, a plurality of threaded studs having inner and outer ends with said inner ends located in said threaded openings, at least one bore in said packing nut alignable with said spaced threaded openings, a circumferential groove in said packing nut for receiving said outer ends of said threaded studs for relative rotation thereto whereby said hydrant nut actuating body can rotate relative to said packing nut while said valve actuating polygonal nut rotates with said hydrant nut actuating body, a shroud positioned in encircling relationship to said packing nut and having a lower portion positioned proximate said hydrant cover, a first rotatable connection between said shroud and said hydrant nut actuating body for permitting free rotation of said shroud on said hydrant nut actuating body, a cap mounted on said hydrant nut actuating body proximate said shroud, and a second rotatable connection between said cap and said hydrant nut actuating body.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view, partially in cross section, of the improved tamper resistant construction of the present invention mounted on a fire hydrant;

FIG. 2 is a fragmentary enlarged cross sectional view taken substantially along line 2—2 of FIG. 1 and showing an actuating wrench in position on the tamper resistant construction;

FIG. 3 is an exploded cross sectional view showing all of the parts of the tamper resistant construction including the wrench, the hole closing plug and the key therefor;

FIG. 4 is a cross sectional view taken substantially along line 4—4 of FIG. 2 and showing the snap ring which rotatably locks the cap to the upper portion of the hydrant nut actuating body;

FIG. 5 is a fragmentary cross sectional view taken substantially along line 5—5 of FIG. 2 and showing the wrench in position on the hydrant nut actuating body of the tamper resistant construction;

FIG. 6 is a cross sectional view taken substantially along line 6—6 of FIG. 2 and showing the manner in which the studs provide a rotatable locking engagement between the hydrant nut actuating body and the packing ring;

FIG. 7 is a view taken substantially in the direction of arrows 7—7 of FIG. 3 and showing the face of the shroud plug which has a curvilinear groove therein;

FIG. 8 is a view taken substantially in the direction of arrows 8—8 of FIG. 3 and showing the curvilinear ridge on the key which mates with the curvilinear groove of the plug; and FIG. 9 is a fragmentary cross sectional view of a prior art hydrant construction taken in a direction analogous to line 2—2 of FIG. 1.

DESCRIPTION OF THE PREFERRED EMBODIMENTS

The improved construction 10 for rendering polygonal nut 11 of fire hydrant 12 tamper resistant against unauthorized actuation includes four basic parts, namely, a hydrant nut actuating body 13 which engages hydrant nut 11 in turning relationship, a shroud 14 rotatably mounted on hydrant nut actuating body 13, a cap 15 rotatably mounted on hydrant nut actuating body 13 and a packing nut 16 which is threadably attached to the hydrant cover 17 and which rotatably supports the hydrant nut actuating body 13. The difference between the present construction 10 and the construction set forth in U.S. Pat. No. 4,936,336 is that any forces which are applied to either the cap 15 or the shroud 14 is transmitted directly to the hydrant cover 17 and thereafter to the hydrant body 18, whereas in the construction of U.S. Pat. No. 4,936,336 any lateral pounding force applied to cap 15 or shroud 14 is applied directly to the hydrant actuating nut 11 which is susceptible of fracture.

In order to install the improved tamper resistant construction onto an existing hydrant, the normal prior art packing nut P (FIG. 10) is unthreaded from hydrant cover 17 after dust shield 26 has been unthreaded from hydrant nut 11 at threads 28. Thereafter, the annular packing nut 16 which forms a part of the present invention and which has threads 20 thereon is threadably secured to the threads 21 of hydrant cover 17 with a O-ring seal 22 therebetween. A bore 23 in the body 24 of the packing nut receives the end of a bar for turning the packing nut 16 into its threaded engagement. The packing nut 16 has a plurality of bores 25 (FIG. 6) therein which are in communication with an internal circumferential groove 27 in the packing nut.

After the packing nut 16 has been installed, an assembly of the hydrant nut actuating body 13, shroud 14 and cap 15 is secured to packing nut 16. In this respect, shroud 14 is mounted on hydrant nut actuating body 13 with a snap ring 39 which fits between groove 40 of shroud 14 and groove 41 of hydrant nut actuating body 13. Cap 15 is mounted on hydrant nut actuating body 13 by a snap ring 45 which fits between groove 47 of cap 15 and groove 49 of hydrant nut actuating body 13. O-ring seals 48 and 42 fit in grooves 50 and 43, respectively, of hydrant nut actuating body 13. The foregoing assembly utilizing snap rings 45 and 39 permits the cap 15 and shroud 14, respectively, to be freely rotatably mounted on hydrant nut actuating body 13 without turning it.

The foregoing assembly of the hydrant nut actuating body 13, shroud 14 and cap 15 is then installed on the previously installed packing nut 16. In this respect the hydrant nut actuating body 13 includes a polygonal recess 29 for receiving the polygonal nut 11 in turning relationship when the lower body portion 30 of hydrant nut actuating body 13 is positioned within cylindrical bore 31 of packing nut 16. The hydrant nut actuating body 13 is maintained in assembled relationship with packing nut 16 by a plurality of studs 32. In this respect studs 32 are threadably received in bores 33 of hydrant nut actuating body 13, and before the lower body portion 30 of actuating nut body 13 can be installed into cylindrical bore 31 of packing nut 16, the studs 32 are threaded all the way into bores 33 so that their ends do not project outwardly therefrom. After hydrant nut actuating body 13 has been inserted into bore 31 so that shoulder 34 engages shoulder 35, the bores 33 with the studs 32 therein will be in alignment with internal annular groove 27 of packing nut 16. Thereafter, the hydrant nut actuating body 13 with the polygonal nut 11 in polygonal bore 29 is rotated so that a bore 33 is in alignment with one of the stud accessing bores 25 in packing nut 16. When one of the bores 33 is aligned with one of the accessing bores 25, each of the bores 33 will be aligned with a respective bore 25. At this point it is to be noted that the foregoing alignment between one of the bores 33 with one of the bores 25 is effected by first aligning the bore 51 in shroud 14 with one of the bores 25 in the packing nut 16 and thereafter rotating the hydrant nut actuating body 13 until one of the bores 33 of the hydrant nut actuating body is aligned with the previously aligned bores 51 and 25.

A suitable matching tool such as an Allen wrench or a screw driver, is then inserted through the aligned bores 51 in shroud 14 and the bore 25 in packing nut 16 to engage the heads 37 of stud 32 to back it out so that the head 37 extends into annular groove 27. The shroud 14 can be rotated so that tapered threaded bore 51 therein will be in alignment with each accessing bore 25 of packing nut 16 which is in alignment with each threaded bore 33 of hydrant nut actuating body 13. Thus, each of the studs 32 can be accessed through the aligned bores 51 and 25 to rotatably connect the hydrant nut actuating body 13 to the packing nut 16. The foregoing alignment among bores 51, 25 and 33 is also effected in the event it is necessary to disconnect hydrant nut actuating body 13 from packing ring 16 in order to remove it and the shroud 14 and cap 15 assembled therewith from hydrant nut 11. However, to prevent unauthorized access to studs 32, a plug 53 is threaded into tapered bore 51 by means of a wrench 54 which has a curvilinear ridge configuration 55 thereon which mates with curvilinear groove 57 of plug 53.

When the tamper resistant assembly 10 is fully assembled, the lowermost edge 59 of cap 15 is spaced a very short distance from the upper edge 60 of shroud 14 to thereby prevent any conventional wrench from turning the nut actuating body 13. It is quite evident that since shroud 14 and cap 15 are freely rotatable on actuating body 13, they cannot be rotated to turn hydrant nut 11.

A special wrench 61 is provided having an elongated handle 62 which has a threaded end 66 which threads into wrench head 63 having an opening 64 which can be passed over cap 15 until lugs 65 are aligned with the narrow space 58 between the edges 59 and 60 of cap 15 and shroud 14, respectively. Thereafter, handle 62 is threaded into wrench head 63 so that it moves from its solid line position in FIG. 5 to its dotted line position to thereby abut the sides of cap 15 and shroud 14. At this time the projections 65 on wrench head 63 will enter two of the equally spaced depressions 69 in hydrant nut actuating body 13 to thus cause the wrench to grip it. Thereafter, wrench 61 can be turned to turn hydrant nut actuating body 13 and hydrant nut 11 a desired amount to either open or close the hydrant. In this respect, the hydrant valve actuating body 13 is coupled to the hydrant valve 70 by hydrant shaft 11' which is connected to hydrant actuating nut 11 which is at the upper end of shaft 11'.

It can thus be seen that by virtue of the above-described construction any pounding which is applied to cap 15 or shroud 14 will be transmitted directly to hydrant top 17 and thereafter to hydrant body 18 and not directly to the hydrant nut 11, as in the structure of the above-mentioned prior U.S. Pat. No. 4,936,336.

While the above description has shown the packing nut 16 to have a plurality of bores 25 each of which is alignable with one of the plurality of bores 33 of the hydrant nut actuating body 13, it will be appreciated that the packing ring can optionally have only a single bore 25. In the latter instance, the hydrant nut actuating body 13 would have to be rotated to align each of the bores 33 with the aligned bores 25 and 51 of the packing nut 16 and shroud 14, respectively, so that access could be had to the stud 32 in each bore 33.

It is to be especially noted that the connection between the studs 32 and groove 25 of packing nut 16 resists the prying up of shroud 14 more than the construction of U.S. Pat. No. 4,936,336 does because there is less leverage, and in the prior device of the patent, the harder pointed set screws can be forced to move along the softer hydrant nut.

It will be appreciated that while the improved construction utilizing the packing nut of the present invention is shown in conjunction with an embodiment utilizing a wrench which enters a space 58 between the cap 15 and shroud 14, the packing nut and hydrant nut actuating body connection of the present invention is equally applicable for use in an embodiment wherein the cap 15 is biased into engagement with a shroud, as disclosed in concurrently filed copending application Ser. No. 08/652,633, filed Jun. 7, 1996.

While a preferred embodiment of the present invention has been disclosed, it will be appreciated that it is not limited thereto but may be otherwise embodied within the scope of the following claims.

What is claimed is:

1. In a fire hydrant having a hydrant body and a hydrant cover mounted on said hydrant body and a hydrant shaft having an upper portion with a valve-actuating polygonal nut positioned at said upper portion of said hydrant shaft and extending outwardly from said hydrant cover, a construction for rendering said nut tamper resistant against unauthorized actuation comprising a packing nut threaded into said hydrant cover proximate to said upper portion of said hydrant shaft, a hydrant nut actuating body, a recess in said hydrant nut actuating body for receiving said polygonal nut in turning relationship, a plurality of circumferentially spaced threaded openings in said hydrant nut actuating body, a plurality of threaded studs having inner and outer ends with said inner ends located in said threaded openings, at least one bore in said packing nut alignable with said spaced threaded openings, a circumferential groove in said packing nut for receiving said outer ends of said threaded studs for establishing a force-transmitting connection between said hydrant nut actuating body and said packing nut while permitting relative rotation between said hydrant nut actuating body and said packing nut whereby said hydrant nut actuating body can rotate relative to said packing nut while said valve actuating polygonal nut retains a turning relationship with said hydrant nut actuating body, a shroud positioned in encircling relationship to said packing nut and having a lower portion positioned proximate said hydrant cover, a first rotatable connection between said shroud and said hydrant nut actuating body for permitting free rotation of said shroud on said hydrant nut actuating body, a cap mounted on said hydrant nut actuating body proximate said shroud, and a second rotatable connection between said cap and said hydrant nut actuating body, said force-transmitting connection between said hydrant nut actuating body and said packing nut transmitting external forces applied to said cap and to said shroud to said hydrant body.

2. In a fire hydrant as set forth in claim 1 wherein said first rotatable connection comprises a snap ring located in opposed grooves in said shroud and said hydrant nut actuating body.

3. In a fire hydrant as set forth in claim 2 wherein said second rotatable connection comprises a second snap ring between opposed grooves in said cap and said hydrant nut actuating body.

4. In a fire hydrant as set forth in claim 1 including a bore in said shroud for selective alignment with each of said plurality of circumferentially spaced threaded openings for turning said threaded studs.

5. In a fire hydrant as set forth in claim 4 including a threaded plug in said bore, and a key for turning said threaded plug.

6. In a fire hydrant as set forth in claim 5 wherein said first rotatable connection comprises a snap ring located in opposed grooves in said shroud and said hydrant nut actuating body.

7. In a fire hydrant as set forth in claim 6 wherein said second rotatable connection comprises a second snap ring between opposed grooves in said cap and said hydrant nut actuating body.

8. In a fire hydrant as set forth in claim 1 wherein said second rotatable connection comprises a second snap ring between opposed grooves in said cap and said hydrant nut actuating body.

9. In a fire hydrant as set forth in claim 1 including a plurality of bores in said packing nut simultaneously alignable with said plurality of threaded bores.

10. In a fire hydrant as set forth in claim 9 including a bore in said shroud for selective alignment with each of said plurality of circumferentially spaced threaded openings for turning said threaded studs.

11. In a fire hydrant as set forth in claim 1 including a space between said cap and said shroud, an exposed surface on said hydrant nut actuating body at said space, and a configuration on said exposed surface for receiving a wrench for turning said hydrant nut actuating body and said hydrant nut therein.

12. A construction for rendering a hydrant nut tamper resistant comprising a packing nut having upper and lower ends, a threaded end on said lower end of said packing nut, an internal circumferential groove in said packing nut, at least one radial accessing bore in said upper end of said packing nut in communication with said internal circumferential groove, a hydrant nut actuating body having upper and lower ends, a plurality of threaded radial bores in said lower end of said hydrant nut actuating body, an opening in said lower end of said hydrant nut actuating body for receiving a hydrant nut, a plurality of threaded studs in said threaded radial bores which are accessible through said accessing bore when each of said threaded radial bores are aligned therewith, said threaded studs occupying positions wherein they are both threaded in said radial threaded bores and extend into said internal circumferential groove to thereby establish a force-transmitting connection between said hydrant nut actuating body and said packing nut which permits relative rotation therebetween, a shroud rotatably mounted on said hydrant nut actuating body, and a cap rotatably mounted on said hydrant nut actuating body proximate said shroud, said force-transmitting connection between said hydrant nut actuating body and said packing nut transmitting external forces applied to said cap and to said shroud to said packing nut.

13. A construction as set forth in claim 12 including a plurality of radial accessing bores in said upper end of said packing nut which are simultaneously alignable with said plurality of threaded radial bores.

14. A construction as set forth in claim 12 wherein said shroud is rotatably mounted on said hydrant nut actuating body by a snap ring which extends between aligned grooves in said hydrant nut actuating body and said shroud.

15. A construction as set forth in claim 14 wherein said cap is rotatably mounted on said hydrant nut actuating body by a second snap ring which extends between aligned second grooves in said hydrant nut actuating body and said cap.

16. A construction as set forth in claim 15 including a plurality of radial accessing bores in said upper end of said packing nut which are simultaneously alignable with said plurality of threaded radial bores.

17. A construction as set forth in claim 12 including a bore in said shroud for selective alignment with each of said plurality of circumferentially spaced threaded openings for turning said threaded studs.

18. A construction as set forth in claim 17 including a threaded plug in said bore, and a key for turning said threaded plug.

19. A construction as set forth in claim 17 including a plurality of radial accessing bores in said upper end of said packing nut which are simultaneously alignable with said plurality of threaded radial bores.

20. A construction as set forth in claim 19 including a threaded plug in said bore, and a key for turning said threaded plug.

21. A construction as set forth in claim 12 including a space between said cap and said shroud, an exposed surface on said hydrant nut actuating body at said space, and a wrench-receiving configuration on said exposed surface.

22. A tamper resistant construction for preventing unauthorized actuation of a fire hydrant comprising a packing nut, a hydrant nut actuating body having a portion located within said packing nut, a receiving recess in said hydrant nut actuating body for receiving hydrant nut, a groove in the packing nut, a plurality of studs extending between the hydrant nut actuating body and said groove in said packing nut to thereby establish a force-transmitting connection between said hydrant nut actuating body and said packing nut which permits relative rotation therebetween, at least one bore in said packing nut in communication with said groove and alignable with said studs, a shroud rotatably mounted on said hydrant nut actuating body, and a cap rotatably mounted on said hydrant nut actuating body proximate said shroud, said force-transmitting connection between said hydrant nut actuating body and said packing nut transmitting external forces applied to said cap and to said shroud to said packing nut.

23. A tamper resistant construction as set forth in claim 22 including a bore in said shroud alignable with said at least one bore in said packing nut.

24. A tamper resistant construction as set forth in claim 23 including a plurality of bores in said packing nut in communication with said groove and alignable with said studs.

25. A tamper resistant construction as set forth in claim 24 including a bore in said shroud alignable with each of said bores in said packing nut.

26. A tamper resistant construction as set forth in claim 22 including a space between said cap and said shroud, an exposed surface on said hydrant nut actuating body at said space, and a wrench-receiving configuration on said exposed surface.

* * * * *

UNITED STATES PATENT AND TRADEMARK OFFICE
CERTIFICATE OF CORRECTION

PATENT NO. : 5,630,442
DATED : May 20, 1997
INVENTOR(S) : Bradley J. Julicher

It is certified that error appears in the above-indentified patent and that said Letters Patent is hereby corrected as shown below:

Column 7, line 9 (claim 22), after "receiving" insert --a--.

Signed and Sealed this

Fifth Day of August, 1997

Attest:

BRUCE LEHMAN

Attesting Officer

Commissioner of Patents and Trademarks